US012394389B2

(12) United States Patent
Chang

(10) Patent No.: US 12,394,389 B2
(45) Date of Patent: Aug. 19, 2025

(54) DISPLAY PANEL, DRIVING METHOD THEREOF, AND ELECTRONIC DEVICE THEREOF

(71) Applicants: Huizhou China Star Optoelectronics Display Co., LTD., Guangdong (CN); TCL CHINA STAR OPTOELECTRONICS TECHNOLOGY CO., LTD., Guangdong (CN)

(72) Inventor: Shuming Chang, Guangdong (CN)

(73) Assignees: Huizhou China Star Optoelectronics Display Co., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/553,550

(22) PCT Filed: Mar. 31, 2023

(86) PCT No.: PCT/CN2023/085718

§ 371 (c)(1),
(2) Date: Sep. 30, 2023

(87) PCT Pub. No.: WO2024/192811

PCT Pub. Date: Sep. 26, 2024

(65) Prior Publication Data

US 2025/0078775 A1 Mar. 6, 2025

(30) Foreign Application Priority Data

Mar. 17, 2023 (CN) ......................... 202310270225.8

(51) Int. Cl.
*G09G 3/36* (2006.01)

(52) U.S. Cl.
CPC ......... *G09G 3/3696* (2013.01); *G09G 3/3607* (2013.01); *G09G 3/3677* (2013.01); *G09G 2320/0242* (2013.01)

(58) Field of Classification Search
CPC ..... G09G 2320/0626; G09G 2330/027; G09G 2330/08; G09G 2360/14
See application file for complete search history.

(56) References Cited

U.S. PATENT DOCUMENTS 9,263,477 B1 * 2/2016 Du ........................ H10D 86/441
10,073,562 B2 * 9/2018 Mo ..................... G06F 3/04166
(Continued)

FOREIGN PATENT DOCUMENTS

CN 103744207 A 4/2014
CN 104299559 A 1/2015
(Continued)

OTHER PUBLICATIONS

International Search Report in International application No. PCT/CN2023/085718, mailed on Nov. 23, 2023.
(Continued)

*Primary Examiner* — Van N Chow
(74) *Attorney, Agent, or Firm* — PV IP PC; Wei Te Chung

(57) ABSTRACT

The present application provides a display panel and a driving method thereof, electronic device, display panel includes data lines, a first sub-pixel and a second sub-pixel disposed adjacently and connected to a same one of the data lines. In a display stage of a first type frame, a second gate electrode driver unit connected to the second sub-pixel outputs a first effective scan signal to control the second sub-pixel to switch on and be loaded with a second data
(Continued)

voltage to emit light, and a first gate electrode driver unit connected to the first sub-pixel controls the first sub-pixel to switch off.

17 Claims, 10 Drawing Sheets

(56) References Cited

U.S. PATENT DOCUMENTS

| | | | | |
|---|---|---|---|---|
| 2015/0325171 A1* | 11/2015 | Zhou | G09G 3/3233 345/80 |
| 2016/0253541 A1* | 9/2016 | Yang | G09G 3/3233 382/124 |

FOREIGN PATENT DOCUMENTS

| | | |
|---|---|---|
| CN | 111812901 A | 10/2020 |
| JP | 2006258712 A | 9/2006 |

OTHER PUBLICATIONS

Written Opinion of the International Search Authority in International application No. PCT/CN2023/085718, mailed on Nov. 23, 2023.

* cited by examiner

DISPLAY PANEL, DRIVING METHOD THEREOF, AND ELECTRONIC DEVICE THEREOF

CROSS REFERENCE TO RELATED APPLICATIONS

This application claims the priority of International Application No. PCT/CN2023/085718, filed on Mar. 31, 2023, which claims the priority to Chinese Application No. 202310270225.8, filed on Mar. 17, 2023. The entire disclosures of the above applications are incorporated herein by reference.

FIELD OF INVENTION

The present application relates to a field of display technologies, especially to manufacture of a display device, and particularly especially to display panel, a driving method thereof, and an electronic device thereof.

BACKGROUND OF INVENTION

A liquid crystal display device, as a widely used display device, is currently considering the cost of the data driver chip. It can adopt a triple-gate electrode driver framework to reduce the number of data lines to one-third of the normal driver framework. At the same time, the number of scanning lines is increased to three times that of the normal driver framework. This results in reducing the width and charging time of each gate electrode pulse to one-third of the normal driver framework.

In the triple-gate electrode driver framework, as shown in FIG. 1, R, G, and B represent the red sub-pixel, green sub-pixel, and blue sub-pixel, respectively. As shown in the figure, when displaying a single-color screen image or a two-color mixed-color screen image, the amplitude of the voltage transmitted by the data lines (any one of D1, D2, D3 to Dn) cyclically fluctuates between high and low, presenting as a flickering screen. This leads to higher power consumption in the source electrode driver module and a decrease in the charging capacity of data lines. Additionally, the opening duration of the pixel driving circuit controlled by the gate electrode line (any one of G1, G2, G3 to Gn) is compressed, resulting in insufficient pixel charging time. Ultimately, this causes color cast issues in single-color screen images or two-color mixed-color screen images, reducing the quality of the displayed screen image.

Therefore, there is an urgent need for improvement in liquid crystal display devices using the conventional triple-gate electrode driver framework due to the aforementioned reasons causing color cast issues in single-color screen images or two-color mixed-color screen images.

SUMMARY OF INVENTION

Technical Issue

An objective of the present application is to provide a display panel, a driving method, and an electronic device thereof to mitigate color cast issues in single-color screen images or two-color mixed-color screen images within the conventional triple-gate electrode driver framework of liquid crystal display devices.

Technical Solution

The present application provides a display panel, comprising:

data lines;

a first sub-pixel and a second sub-pixel disposed adjacent to each other and connected to one of the data lines, wherein a color of the first sub-pixel is different from a color of the second sub-pixel, the data line is configured to sequentially transmit a first data voltage and a second data voltage corresponding to the first sub-pixel, the second sub-pixel respectively;

a first gate electrode driver unit and a second gate electrode driver unit connected to the first sub-pixel and the second sub-pixel respectively;

wherein in a display stage of a first type frame, the second gate electrode driver unit outputs a first effective scan signal for switching on the second sub-pixel to emit light based on the second data voltage, and the first gate electrode driver unit controls the first sub-pixel to switch off.

Advantages

The present application discloses a display panel and its driving method, along with an electronic device. In the display stage of a first type frame, the first sub-pixel can be turned off by controlling the first gate electrode driver unit, meaning that the first sub-pixel is not scanned. This change results in the transition from sequentially scanning both the first sub-pixel and the second sub-pixel simultaneously to at least non-scanning of the first sub-pixel within the same time frame. Relatively speaking, the scanning duration for the second sub-pixel can be extended, effectively utilizing the time originally required to scan the first sub-pixel. This, in turn, increases the charging duration of the second sub-pixel, leading to an improvement in color accuracy and enhancing the quality of the displayed screen image.

DESCRIPTION OF DRAWINGS

Further explanation of the present application is provided through the following illustrations. It should be noted that the drawings in the following description are solely intended to clarify certain embodiments of the present application. For professionals in this field, it is possible to obtain additional illustrations based on these drawings without the need for inventive effort.

DETAILED DESCRIPTION OF PREFERRED EMBODIMENTS

Figure 1:
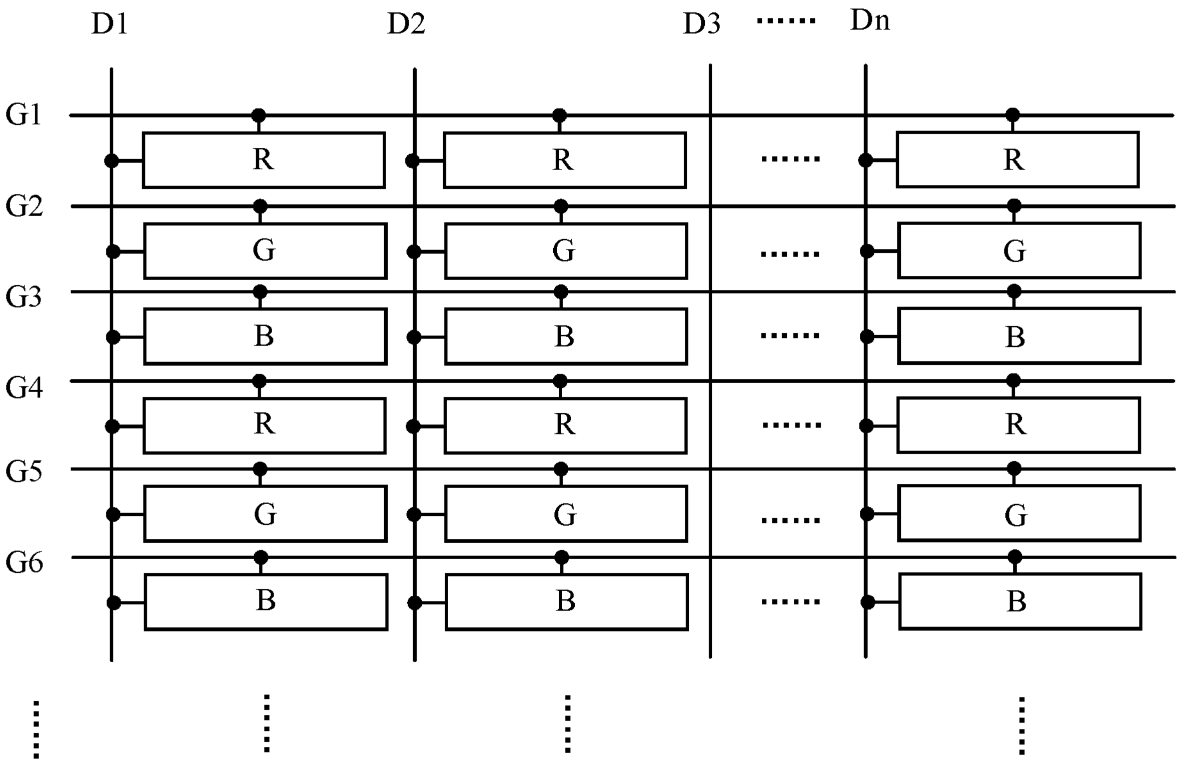
FIG. 1 is a framework diagram at a top viewing angle of a display panel having triple-gate electrode driver provided by the embodiment of the present application.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In the description of the present application, terms such as "first," "second," and the like are used solely for descriptive purposes and should not be construed as indicating or implying relative importance or specifying the quantity of technical features being referred to. Consequently, features labeled as "first" or "second" may explicitly or implicitly encompass one or more of the said features. Furthermore, it should be clarified that the illustrations provided are limited to structures closely related to the present application. Some details unrelated to the application have been omitted with the purpose of simplifying the drawings, making the key points of the application more apparent, rather than suggesting that the actual device is identical to the drawings. Specifically, the term "equal to," as mentioned in the present application, can denote not only equality between two items but also signify that the difference between them is extremely small, such as an absolute difference value smaller than a threshold value. This threshold value can be set according to the actual circumstances and is intended to convey the concept of "is equal to." In particular, the terms "previous pixel unit" and "next pixel unit" mentioned in the present application can be understood to mean that, among adjacent pairs of pixel units, the data line transmits "previous pixel unit" and "next pixel unit" corresponding to two distinct data voltages, respectively.

"Embodiment" mentioned in the specification means that specific features, structures, or characteristics described in combination with the embodiments can be included in at least one embodiment of the present invention. Terminologies presenting at each location of the specification do not necessarily refer to the same embodiment, and is either not an individual or backup embodiment mutually exclusive to other embodiment. A person of ordinary skill in the art can explicitly or implicitly understand that the embodiment described in the specification can combine other embodiment.

The present application provides a display panel, the display panel can comprise but is not limited to any combination of the following embodiments.

In an embodiment, with reference to FIGS. 2 to 8, a display panel 100 comprises: data lines 10; a first sub-pixel 201 and a second sub-pixel 202 disposed adjacent to each other and connected to the same one of the data lines 10, wherein a color of the first sub-pixel 201 is different from a color of the second sub-pixel 202. With reference to FIGS. 5 to 8, the data line 10 is configured to sequentially transmit a first data voltage VB and a second data voltage VG corresponding to the first sub-pixel 201 and the second sub-pixel 202 respectively. A first gate electrode driver unit 301 and a second gate electrode driver unit 302 are connected to the first sub-pixel 201 and the second sub-pixel 202 respectively. In a display stage of a first type frame, the second gate electrode driver unit 302 outputs a first effective scan signal gate1 to control the second sub-pixel 202 (green sub-pixel G) to switch on, the second data voltage VG controls the second sub-pixel 202 to emit light, and the first gate electrode driver unit 301 controls the first sub-pixel 201 (blue sub-pixel B) to switch off.

The display stage of the first type frame can be understood as a time period occupied to sequentially scan a plurality of sub-pixels of different rows to control the sub-pixels to switch on for displaying a first type frame. When each of the data lines 10 is connected to the first sub-pixels 201 (blue sub-pixels B) and the second sub-pixels 202 (green sub-pixel G) arranged circularly, as shown in FIGS. 2 and 3, then each time switching on the first sub-pixel 201 and the second sub-pixel 202 in a circle requires a duration of T0, and switching on the first sub-pixels 201 and the second sub-pixels 202 of all circles requires a duration of several T0*s*.

"The first gate electrode driver unit 301 controls the first sub-pixel 201 (blue sub-pixel B) to switch off" can be understood as non-scanning of the first sub-pixel 201 (blue sub-pixel B), namely, T0 needs no allocation of duration for scanning the first sub-pixel 201.

The display panel 100 can comprise a plurality of sub-pixels, the sub-pixels can at least comprise first sub-pixels 201 and second sub-pixel 202 in different colors. The present application, for convenience of explanation, only uses the sub-pixels arranged in an array, the sub-pixels of the same column connected to the same one of the data lines 10, the sub-pixels of the same row connected to the same gate electrode driver unit 30, and the first sub-pixel 201 and the second sub-pixel 202 being a blue sub-pixel B and a green sub-pixel G respectively, as an example for explanation. However, the above configuration is not limited. Furthermore, the sub-pixels of the same row can be electrically connected to a corresponding gate electrode driver unit 30 through the same gate electrode line 40. For instance, the first gate electrode driver unit 301 and the second gate electrode driver unit 302 can be electrically connected to the blue sub-pixels B and the green sub-pixel G of the corresponding row through a corresponding first gate electrode line G4 and a corresponding second gate electrode line G5. The gate electrode line 40 can transmit a scan signal generated by a corresponding gate electrode driver unit 30 to the sub-pixels of a corresponding row. If the scan signal is a corresponding effective scan signal, it can control the sub-pixels of a corresponding row to switch on, namely, it can control a plurality of transistors corresponding to the sub-pixels of a corresponding row to switch on such that the sub-pixels of the row can be loaded with corresponding data voltages through the data lines 10 respectively to emit light to present corresponding brightness.

Figure 2:
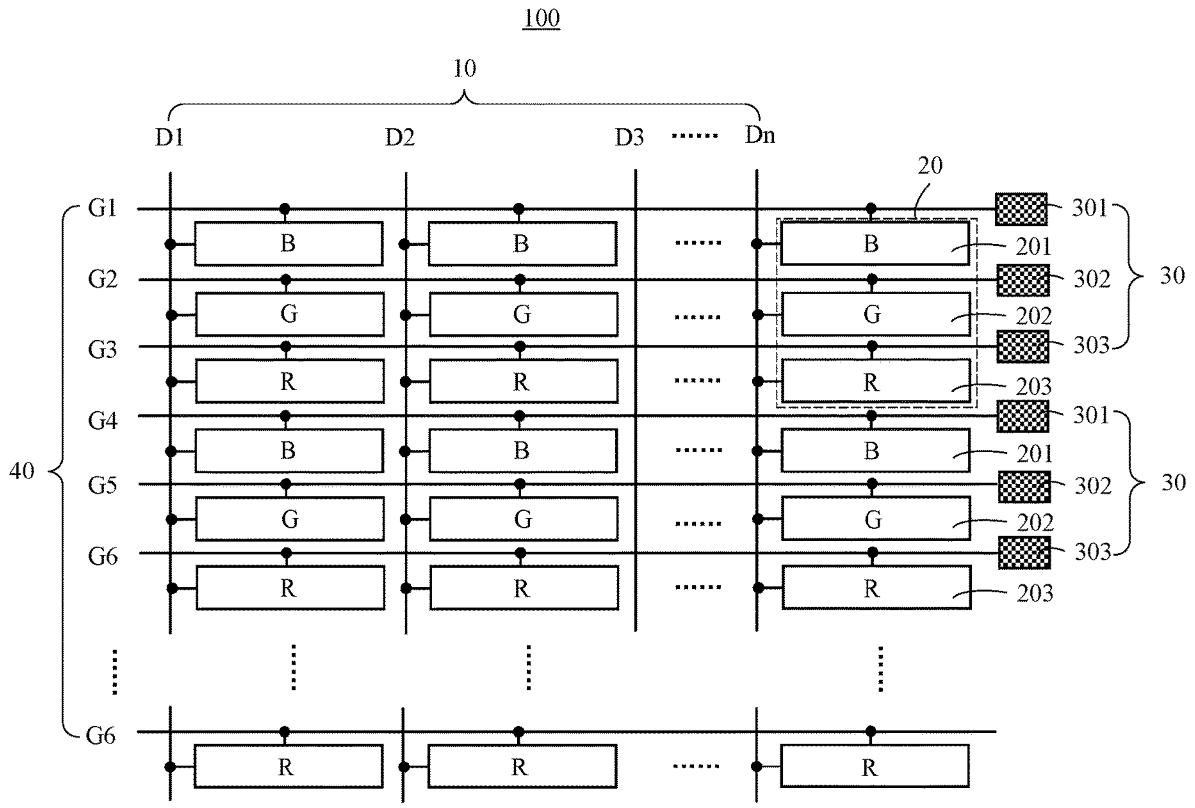
FIG. 2 is a framework diagram of at a top viewing angle of another display panel having a triple-gate electrode driver provided by the embodiment of the present application.
Figure 3:
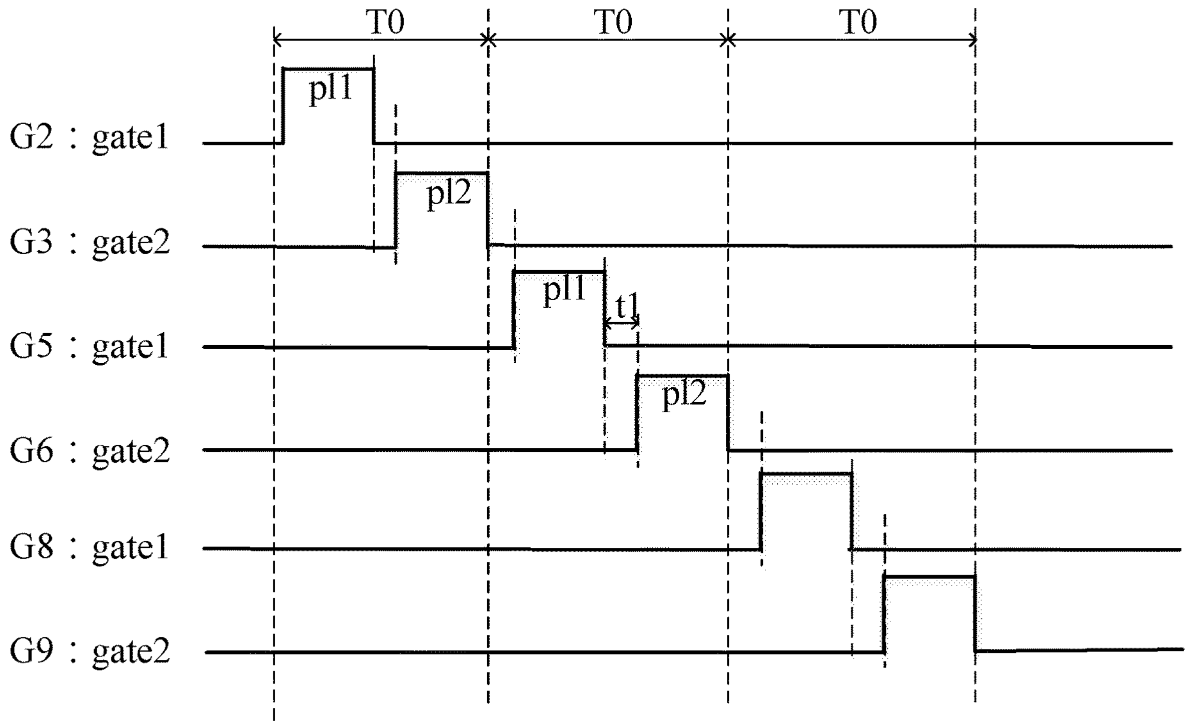
FIGS. 3 and 4 are waveform diagrams of scan signals of two display panels provided by the embodiment of the present application.

In particular, for convenience of description, it can be considered that the data lines 10, from bottom to top, sequentially transmits a plurality of data voltages corresponding to the sub-pixels, and the first sub-pixel 201 (blue sub-pixel B) and the second sub-pixel 202 (green sub-pixel G) corresponding to the first data voltage VB and the second data voltage VG sequentially transmitted by the data line 10 can be located in a previous row and a next row respectively, for example, the blue sub-pixel B in FIG. 2 is located in a fourth row, and the green sub-pixel G is located in a fifth row.

It can be understood that the display panel 100 in the present embodiment comprises the display stage of the first type frame, and in this stage, the second sub-pixel 202 is controlled based on the second data voltage VG to emit light, the first gate electrode driver unit 301 does not scan the first sub-pixel 201, the second gate electrode driver unit 302 outputs a first effective scan signal to control the second sub-pixel 202 to switch on. Namely, it can be considered that sequentially scanning the first sub-pixel 201 and the second sub-pixel 202 in the same time changes to at least skipping scanning the first sub-pixel 201 in the same time. Comparatively, a duration for scanning the second sub-pixel 202 can be prolonged. Namely, a time originally required for scanning the first sub-pixel 201 is utilized to increase a charging duration of the second sub-pixel 202 to mitigate the color cast, which improves quality of the displayed screen image.

It should be noted that the present embodiment only limits that in the display stage of the first type frame, the first gate electrode driver unit 301 does not scan the first sub-pixel 201. However, it can be considered that the data line 10 still sequentially transmits the first data voltage VB and the second data voltage VG, and at least can realize at least in a time period of the second sub-pixel 202 switching on, data line at least transmits a second data signal applied to the second sub-pixel 202.

Figure 4:
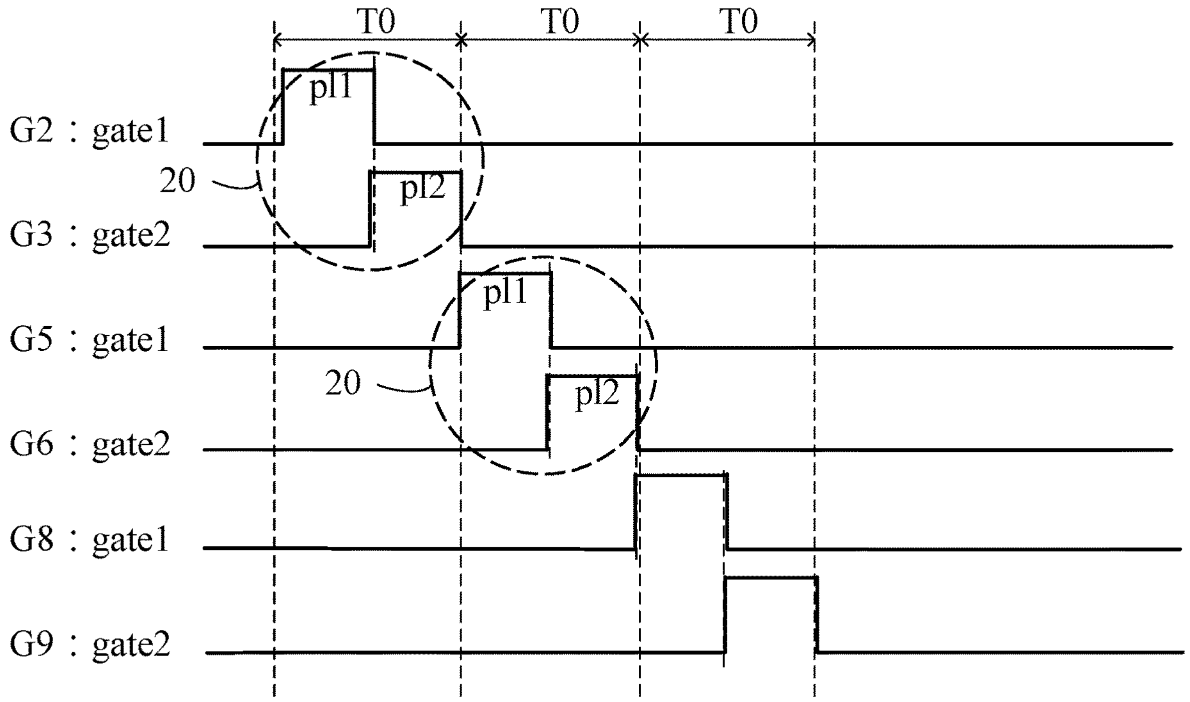

In an embodiment, based on FIGS. 2 to 4, the display panel 100 further comprises: a timing control module connected to the first gate electrode driver unit 301 and the second gate electrode driver unit 302; wherein in the display stage of the first type frame, the timing control module transmits a effective clock signal to the second gate electrode driver unit 302 such that the second gate electrode driver unit 302 outputs the first effective scan signal gate1. The timing control module transmits a null clock signal to the first gate electrode driver unit 301 such that the first gate electrode driver unit 301 outputs a null scan signal to the first sub-pixel 201. Alternatively, the timing control module is disconnected from the first gate electrode driver unit 301 such that the first gate electrode driver unit 301 is disconnected from the first sub-pixel 201.

It can be understood that in the present embodiment, by controlling the timing control module to transmit a null clock signal to the first gate electrode driver unit 301 to drive the first gate electrode driver unit 301 to output a null scan signal to the first sub-pixel 201, scanning the first sub-pixel 201 can be skipped. It can be understood that in the null scan signal includes no corresponding effective pulse to realize non-scanning of the first sub-pixel 201. Alternatively, non-scanning of the first sub-pixel 201 is implemented by controlling a manner of disconnection between the timing control module and the first gate electrode driver unit 301. For instance, a switch element such as, but not limited to, a transistor can be disposed between the timing control module and the first gate electrode driver unit 301 to control the connection and disconnection between the timing control module and the first gate electrode driver unit 301.

In an embodiment, based on FIG. 2, in a display stage of a second type frame, the first gate electrode driver unit 301 outputs a third effective scan signal to control the first sub-pixel 201 to switch on, and the first data voltage VB controls the first sub-pixel 201 to emit light. The second gate electrode driver unit 302 outputs the first effective scan signal gate1 to control the second sub-pixel 202 to switch on, and the second data voltage VG controls the second sub-pixel 202 to emit light.

It should be noted that in combination the above description, the present application can improve the display stage of the first type frame, which can be understood that a difference between theoretical light emission brightness of the second sub-pixel 202 and theoretical light emission brightness (0) of the first sub-pixel 201 is greater, resulting in a stage of the second sub-pixel 202 in a next row having a color cast risk. Of course, a display stage of a second type frame also exists, which can be understood that a difference between the theoretical light emission brightness of the second sub-pixel 202 and theoretical light emission brightness of the first sub-pixel 201 is less, not resulting in a stage of the second sub-pixel 202 in a next row having a color cast risk. In the meantime, the first sub-pixel 201 and the second sub-pixel 202 can be sequentially scanned normally and the first sub-pixel 201 and the second sub-pixel 202 can be controlled to emit light with corresponding brightness, respectively.

In an embodiment, with reference to FIGS. 5 to 8, in the display stage of the first type frame, the first data voltage VB at least comprises a first sub-data voltage VB1, the first sub-data voltage VB1 is equal to the second data voltage VG, when the second sub-pixel 202 switches on, the data line 10 sequentially transmits the first sub-data voltage VB1 and the corresponding second data voltage VG. It can be understood that the present embodiment further configures that in the display stage of the first type frame, the first data voltage VB is set at least comprises a first sub-data voltage VB1 equal to second data voltage VG. Namely, when the second sub-pixel 202 switches on, the present embodiment, on the basis of increasing a charging duration of the second sub-pixel 202, can further set the first sub-data voltage VB1 in first data voltages VB transmitted by the data line 10 near the second data voltage VG to be equal to second data voltage VG such that before the second data voltage VG is applied to the second sub-pixel (namely, before the second sub-pixel 202 switches on), the data line 10 can transmit the first sub-data voltage VB1 equal to the second data voltage VG, which reduces an amount of signal decay of the second data voltage VG transmitted by the data line in a later stage to improve reliability of light emission of the second sub-pixel 202.

In an embodiment, with reference to FIG. 2, it further comprises a third sub-pixel 203 disposed adjacent to the second sub-pixel 202, and the third sub-pixel 203 and the second sub-pixel 202 are connected to one of the data lines 10. A color of the third sub-pixel 203 is different from a color of the first sub-pixel 201 and a color of the second sub-pixel 202. The data line 10 is configured to sequentially transmit the first data voltage VB, the second data voltage VG and a third data voltage VR corresponding to the first sub-pixel 201, the second sub-pixel 202, and the third sub-pixel 203 that are disposed consecutively. A third gate electrode driver unit 303 is connected to the third sub-pixel 203. In the display stage of the first type frame, after the second sub-pixel 202 switches on, the third gate electrode driver unit 303 outputs a second effective scan signal gate2 to control the third sub-pixel 203 (red sub-pixel R) to switch on, the third data voltage VR controls the third sub-pixel 203 to emit light or not to emit light, or the third gate electrode driver unit 303 controls the third sub-pixel 203 to switch off.

Similarly, "the third gate electrode driver unit 303 controls the third sub-pixel 203 to switch off" can also be understood as non-scanning of the third sub-pixel 203 (red sub-pixel R), namely, in T0, no allocation of a duration is required for scanning the third sub-pixel 203.

Similarly, here for convenience of description, the third sub-pixel 203 being a red sub-pixel R is used as an example for explanation, and it can be considered that the first sub-pixel 201 (blue sub-pixel B) and the third sub-pixel 203 can be located in a previous row and a next row of the second sub-pixels 202 (green sub-pixels G) respectively. For instance, the blue sub-pixel B in FIG. 2 is located in the fourth row, the green sub-pixel G is located in the fifth row, and the red sub-pixel R is located in a sixth row.

It can be understood that in the display stage of the first type frame, on the basis of the second gate electrode driver unit 302 outputting a first effective scan signal to control the second sub-pixel 202 to switch on, and the first gate electrode driver unit 301 not scanning the first sub-pixel 201, the present embodiment further discloses that the red sub-pixel R is disposed after the green sub-pixel G. However, for the display stage of the first type frame, no limit is for scanning of the third sub-pixel 203 (red sub-pixel R).

In particular, with reference to FIGS. 3 and 4, based on non-scanning of the first sub-pixel 201 (it can be considered that at least a duration of the first sub-pixel 201 is scanned, namely, a width of a first pulse pl1 of the first effective scan signal gate1 would increase, but no limit is for increase of a width of a second pulse pl2 of the second effective scan signal gate2), here scanning of the third sub-pixel 203 (red sub-pixel R) is used as an example:

For example, reference to FIG. 3, in the display stage of the first type frame, a first duration t1 can be formed between the first pulse pl1 of the first effective scan signal gate1 configured to control the second sub-pixel 202 (green sub-pixel G) to switch on and the second pulse pl2 of the second effective scan signal gate2 configured to control the third sub-pixel 203 (red sub-pixel R) to switch on. For instance, as shown in FIG. 4, in the display stage of the first type frame, there can be no time interval formed between the first pulse pl1 of the first effective scan signal gate1 configured to control the second sub-pixel 202 (green sub-pixel G) to switch on and the second pulse pl2 of the second effective scan signal gate2 configured to control the third sub-pixel 203 (red sub-pixel R) to switch on.

Figure 7:
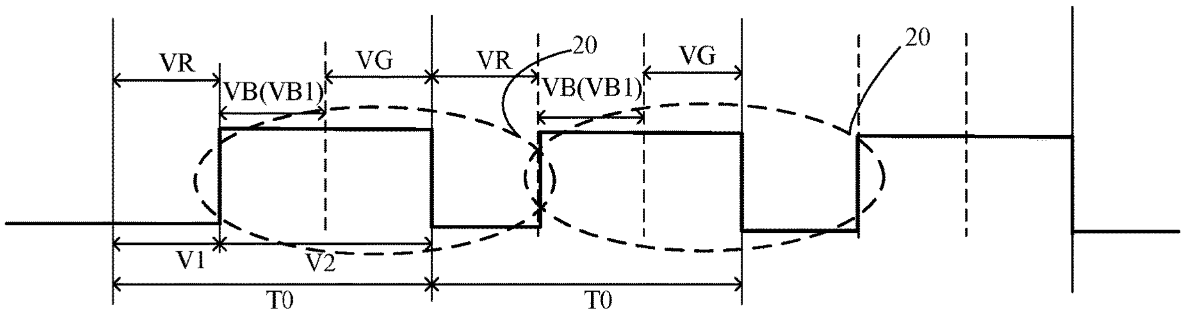
Figure 8:
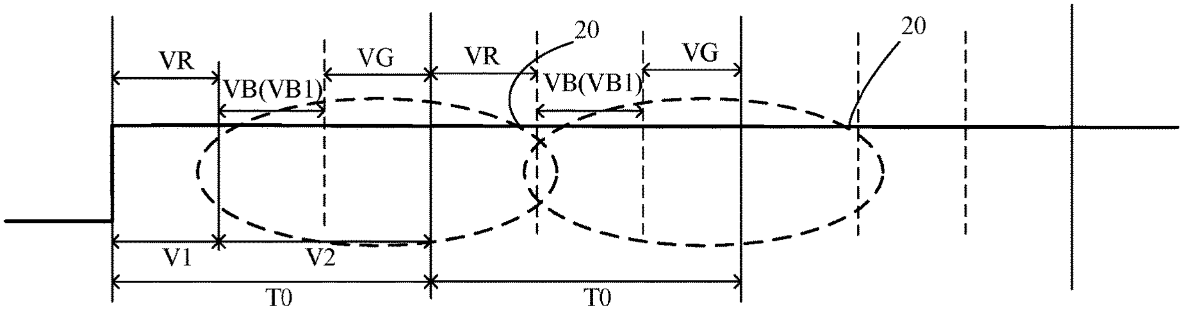

In particular, here the display stage of the first type frame, the second data voltage VG being a greater value is used as an example for explanation: After the second sub-pixel 202 switches on, the third sub-pixel 203 (red sub-pixel R) can also switch on. with reference to FIGS. 5 to 7, the third data voltage VR controls the third sub-pixel 203 not to emit light (for instance, the third data voltage VR is a comparatively small value). As shown in FIG. 7, when the first data voltage VB is equal to second data voltage VG, the data line 10 in each of the display stage of the first type frame sequentially transmits equal and higher first data voltage VB and second data voltage VG, and a lower third data voltage VR. With reference to FIG. 8, the third data voltage VR controls the third sub-pixel 203 to emit light (for instance, the third data voltage VR is a greater value), and then the data line 10 in each of the display stage of the first type frame sequentially transmits equal and higher three data voltages as the first data voltage VB, the second data voltage VG, and the third data voltage VR.

In an embodiment, the same one of the data lines 10 is connected to first sub-pixels 201 and second sub-pixels 202, the data line 10 is at least configured to sequentially transmit each of the first data voltage VB and a corresponding second data voltage VG. In the display stage of the first type frame, the second gate electrode driver units 302 output the corresponding first effective scan signals gate1 to control the second sub-pixels 202 to sequentially switch on and be loaded with the corresponding second data voltages to emit light. Each of the first gate electrode driver units 301 control the corresponding first sub-pixel 201 to switch off (namely, non-scanning). As described above, it can be considered that in the same time, alternately scanning the first sub-pixels 201 and the second sub-pixels 202 changes to sequentially scanning the second sub-pixels 202 such that a duration scanning each of the second sub-pixels 202 can be prolonged, which increases a charging duration of the second sub-pixel 202 to mitigate the color cast.

Similarly, if the third sub-pixel 203 exists, also in the display stage of the first type frame, a plurality of third gate electrode driver units 303 correspondingly outputs a plurality of the second effective scan signals gate2 to control the third sub-pixels 203 to sequentially switch on. It can be considered that in the same time, sequentially scanning a plurality of pixel units 20, and in each of the pixel units 20, sequentially scanning the first sub-pixel 201, the second sub-pixel 202, and the third sub-pixel 203, changes to in each of the pixel units 20, sequentially scanning the second sub-pixel 202 and the third sub-pixel 203, prolongs a duration of scanning each second sub-pixel 202, which increases a charging duration of the second sub-pixel 202 to mitigate the color cast.

In an embodiment, with reference to FIGS. 2 to 8, the display panel 100 comprises a plurality of pixel units 20 connected to the same one of the data lines 10, and each of the pixel units 20 comprises a first sub-pixel 201, a second sub-pixel 202, and a third sub-pixel 203. In the display stage of the first type frame, with reference to FIGS. 3 and 4, a time period of the third sub-pixel 203 (the red sub-pixel R located in the third row) of previous one of the pixel units 20 switching on (for instance, the second pulse pl2 corresponding to the gate electrode line G3 at least should transmit the third data voltage VR) has no overlap with a time period of the first sub-data voltage VB1 corresponding to the first sub-pixel 201 (the blue sub-pixel B located in the fourth row) of next one of the pixel units 20 transmitted by the data lines 10.

It should be noted that in the display stage of the first type frame, when the third sub-pixel 203 (the red sub-pixel R located in the third row) corresponding to a previous one of the pixel units 20 switches on and is loaded with the corresponding third data voltage VR, and the corresponding third data voltage VR is unequal to the first sub-data voltage VB1, interference of light emission brightness of the sub-pixels easily occurs due to the third data voltage VR corresponding to the previous pixel unit 20 transmitted by the data lines 10 and the first sub-data voltage VB1 corresponding to the next pixel unit 20 are disposed adjacent to each other and are unequal.

In particular, here the description is based on adjacent two of the pixel units 20, in combination with the above description, even no scanning of the first sub-pixel 201 is performed, the data lines 10 still transmits the first data voltage VB. For instance, the first data voltage VB corresponding to the first sub-pixel 201 (the blue sub-pixel B located in the fourth row) at least comprises a first sub-data voltage VB1 equal to the second data voltage VG. The present embodiment further defines that a time period of the first sub-data voltage VB1 corresponding to the first sub-pixel 201 (the blue sub-pixel B located in the fourth row) has no overlap with a time period of the third sub-pixel 203 (the red sub-pixel R located in the third row) of the previous pixel unit 20 switching on, which can prevent the first sub-data voltage VB1 from being erroneously supplied to the third sub-pixel 203 (the red sub-pixel R located in the third row) and causing the third sub-pixel 203 unable to achieve corresponding light emission or non-light emission.

Figure 5:
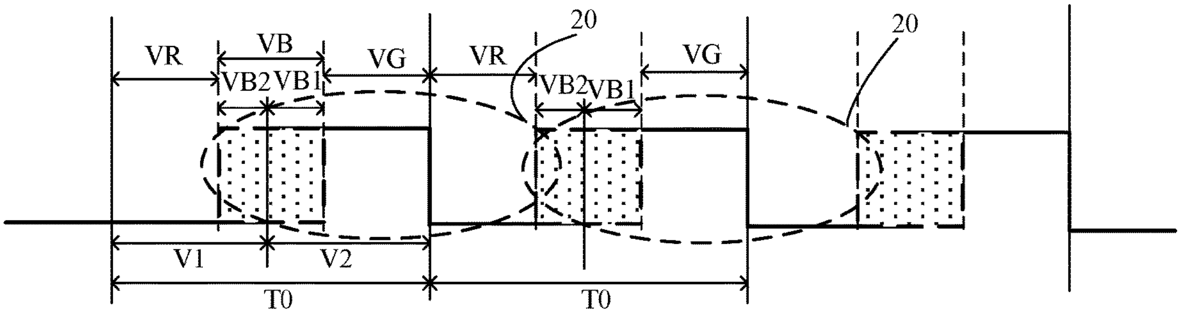
FIGS. 5 to 8 and 10 are waveform diagrams of data signals of five display panels provided by the embodiment of the present application.
Figure 6:
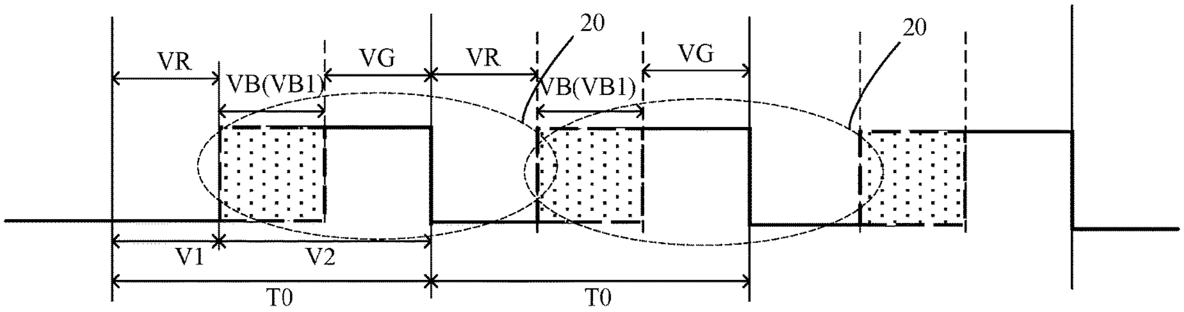
Figure 10:
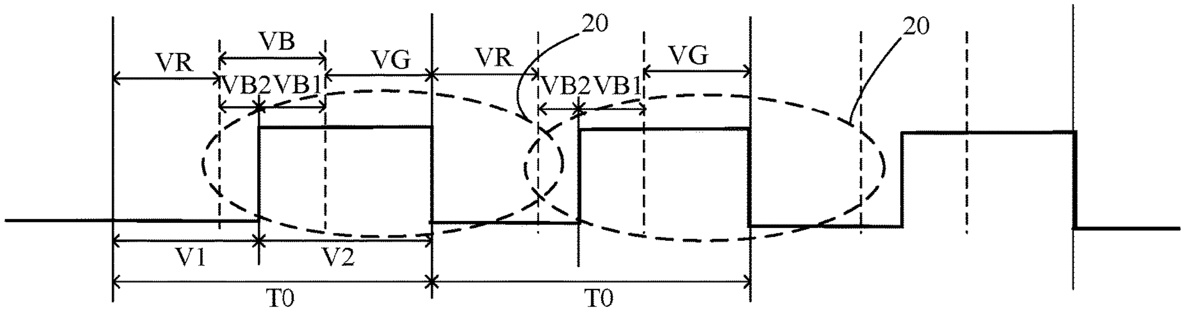

In an embodiment, with reference to FIGS. 5 and 10, in the display stage of the first type frame, (for instance, but no limit to correspondence of a next one of the pixel units 20) the first data voltage VB further comprises a second sub-data voltage VB2, and the second sub-data voltage VB2 is equal to the third data voltage VR. When the third sub-pixel 203 (red sub-pixel R located in a third row) corresponding to a previous one of the pixel units 20 switches on, the data line 10 sequentially transmits the third data voltage VR and the second sub-data voltage VB2. Furthermore, in combination with the above description, the first sub-pixel 201 corresponding to a next one of the pixel units, and the data line 10 sequentially transmits the third data voltage VR, the second sub-data voltage VB2, and the first sub-data voltage VB1.

In particular, as shown in FIG. 10, here, corresponding to the previous pixel unit 20, the third data voltage VR is referred to as "lower voltage," and corresponding to the next pixel units, the second data voltage VG is referred to as "higher voltage." Then, the second sub-data voltage VB2 and the first sub-data voltage VB1 in the first data voltage VB are also respectively referred to as "lower voltage" and "higher voltage." Additionally, as illustrated in FIG. 5, the durations occupied by the second sub-data voltage VB2 and the first sub-data voltage VB1 in the first data voltage VB can be equal. Furthermore, as shown in FIG. 10, the durations occupied by the second sub-data voltage VB2 and the first sub-data voltage VB1 in the first data voltage VB can also be unequal, and here, only an example, where the former is smaller than the latter for illustration purposes, is provided.

It can be understood that the present embodiment sets the first data voltage VB to further comprise second sub-data voltage VB2equal to a corresponding a next one of the pixel unit 20. Also, when the third sub-pixel 203 (the red sub-pixel R located in the third row) corresponding to the same one of the pixel units 20 switches on, the data lines 10, after transmitting the corresponding third data voltage VR, also transmits a second sub-data voltage VB2 included in the first data voltage VB. Similarly, after the third data voltage VR is applied to the third sub-pixel 203, the data line 10 can also transmit the second sub-data voltage VB2 equal to third data voltage VR to maintain the second sub-data voltage VB2 equal to third data voltage VR to be applied subsequently to the third sub-pixel 203, which compensates an amount of signal decay of the data voltage VR transmitted by the data line 10 in an early stage to improve reliability of light emission of the third sub-pixel 203.

In an embodiment, with reference to FIGS. 2 and 3, in the display stage of the first type frame, a time interval is formed between an end moment of the third sub-pixel 203 (red sub-pixel R located in a third row, corresponding to the gate electrode line G3) in a previous one of the pixel units 20 switching on, next one of the pixel units 20 and a start moment of the second sub-pixel 202 (the green sub-pixel G located in the fifth row, corresponding to the gate electrode line G5) switching on. In particular, as shown in FIG. 3, in combination with the above description, the present embodiment sets of the second pulse pl2 (for instance, corresponding to the red sub-pixel R located in the third row) and the first pulse pl1 (for instance, the green sub-pixel G corresponding to the fifth row) adjacent two of the pixel units 20 of disposed adjacently to have a time interval. Namely, a blanking time period (the time interval between the above second pulse pl2 and first pulse pl1) is disposed between adjacent two (rows) of the pixel units 20. For example, the data line 10 can transmit the above-mentioned first sub-data voltage VB1 in the blanking time period. Under the basis of lowering an amount of signal decay of the second data voltage VG transmitted by the data line in a later stage, to improve reliability of light emission of the second sub-pixel 202, a risk of the first sub-data voltage VB1 erroneously supplied to the third sub-pixel 203 (the red sub-pixel R located in the third row) can be reduced.

In an embodiment, based on FIG. 2, namely, the display panel 100 comprises a plurality of the pixel units 20 connected to the same one of the data lines 10. In the display stage of the first type frame, different from the third data voltage VR in FIG. 6 being a constant value, (for instance, but no limit to next one of the pixel units 20) the third data voltage VR comprises a third sub-data voltage and a fourth sub-data voltage (not shown). A difference between the third sub-data voltage corresponding to the same one of the pixel units and the second data voltage VG corresponding to a previous one of the pixel units 20 (an absolute of a difference) is greater than a difference between the fourth sub-data voltage and the second data voltage VG (an absolute of a difference), when the third sub-pixel 203 (red sub-pixel R) switches on, the data line 10 sequentially transmits the third sub-data voltage, the fourth sub-data voltage.

It can be understood that the present embodiment sets the third data voltage VR corresponding to the third sub-pixel 203 (red sub-pixel R) to sequentially include a third sub-data voltage having a greater difference from the second data voltage VG corresponding to a previous pixel unit 20 and a fourth sub-data voltage having a less difference from the second data voltage VG corresponding to a previous pixel unit 20 such that the third sub-data voltage transmitted by the data line 10 can over-drive the third sub-pixel 203 before the fourth sub-data voltage arrives in, which lowers an amount of signal decay of the data voltage VR transmitted by the data line 10 in a later stage to improve reliability of light emission of the third sub-pixel 203.

In an embodiment, based on FIG. 2, in the display stage of the first type frame, the third gate electrode driver unit 303 controls the third sub-pixel 203 to switch off (namely, the third sub-pixel 203 is not scanned). Different from the third data voltage VR corresponding to the third sub-pixel 203 as shown in FIGS. 5 to 8, the third data voltage VR at least comprises a fifth sub-data voltage (not shown), the fifth sub-data voltage corresponding to the same one of the pixel units is equal to the corresponding second data voltage VG. When the second sub-pixel 202 switches on and the third sub-pixel 203 switches off, the data line 10 sequentially transmits the second data voltage VG and the corresponding fifth sub-data voltage.

It can be understood that because the third gate electrode driver unit 303 does not scan the third sub-pixel 203, the second gate electrode driver unit 302 outputs the first effective scan signal to control the second sub-pixel 202 to switch on. Namely, it can be considered that the duration of scanning the second sub-pixel 202 in the same time can further comprise a time originally required to scan the third sub-pixel 203 such that the charging duration of the third sub-pixel 203 can be increased to mitigate the color cast. Furthermore, in combination with the discussion regarding the second sub-data voltage VB2 mentioned in the previous context, after the second data voltage VG is applied to the second sub-pixel 202, the data lines 10 can also transmit a fifth sub-data voltage equal to the second data voltage VG, which can compensate an amount of signal decay of the second data voltage VG transmitted by the data line 10 in an early stage to improve reliability of light emission of the second sub-pixel 202.

The present application further comprises an electronic device, the electronic device can comprise any one of the display panels as described above.

Figure 9:
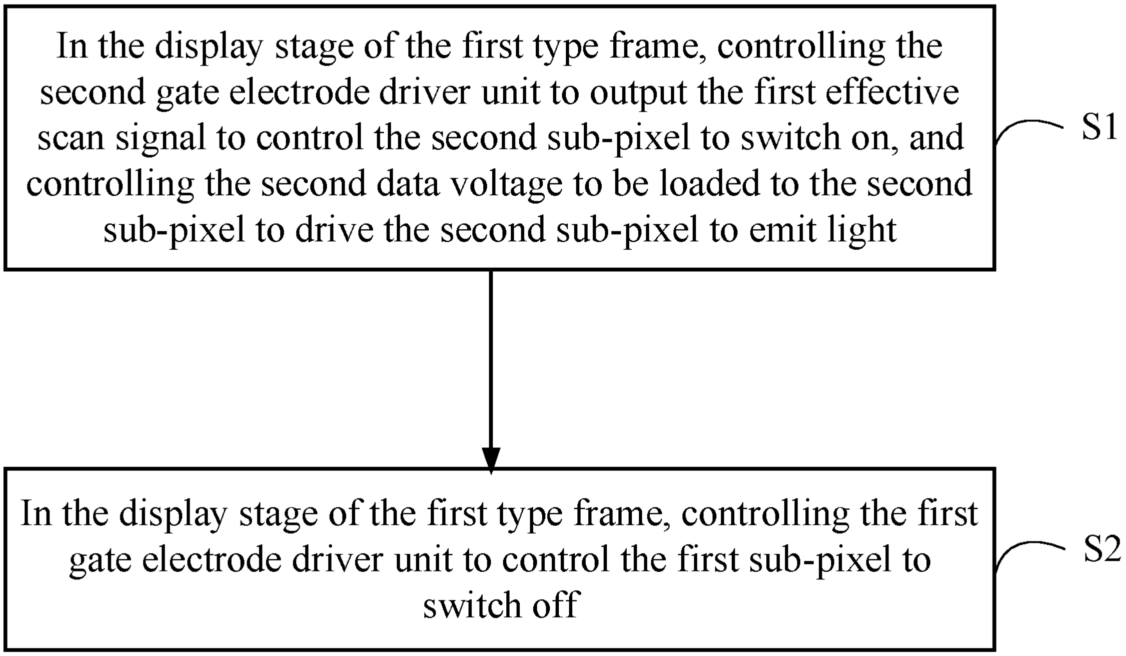
FIG. 9 is a flowchart of a display panel driving method provided by the embodiment of the present application.

The present application also provides a display panel driving method for driving any display panel as described above. With reference to FIGS. 2 to 8, as shown in FIG. 9, the method can comprise but is not limited to steps as follows:

A step S1 comprises in the display stage of the first type frame, controlling the second gate electrode driver unit 302 (for instance, corresponding to the gate electrode line G2) to outputs the first effective scan signal gate1 to control the second sub-pixel 302 (for instance, corresponding to the green sub-pixel G located in a second ro) to switch on, and controlling the second data voltage VG to be loaded to the second sub-pixel 202 such that the second sub-pixel 202 emits light.

A step S2 comprises in the display stage of the first type frame, controlling the first gate electrode driver unit 301 to control the first sub-pixel 201 to switch off.

It can be understood that during the display stage of the first type frame, the first sub-pixel 201 is not scanned by controlling the first gate electrode driver unit 301. Simultaneously, the second gate electrode driver unit 302 is controlled to output the first effective scan signal to control the second sub-pixel 202 to switch on. Combining the information discussed earlier, it becomes evident that this approach extends the scanning duration of the second sub-pixel 202. Consequently, it increases the charging duration of the second sub-pixel 202, leading to color cast mitigation and an improvement in the quality of the displayed screen image.

In an embodiment, based on FIG. 2, the display panel 100 further comprises a timing control module connected to the first gate electrode driver unit and the second gate electrode driver unit. wherein the step S2 can comprise: a step S201 comprising in the display stage of the first type frame, controlling the timing control module to transmit a null clock signal to the first gate electrode driver unit such that the first gate electrode driver unit outputs a null scan signal to the first sub-pixel, or controlling the timing control module to be disconnected from the first gate electrode driver unit such that the first gate electrode driver unit is disconnected from the first sub-pixel.

In particular, as mentioned earlier, with reference to the preceding discussion, during the display stage of the first type frame, it is possible to achieve the non-scanning of the first sub-pixel 201 by controlling the timing control module to transmit a null clock signal to the first gate electrode driver unit 301 such that the first gate electrode driver unit 301 outputs a null scan signal to the first sub-pixel 201, thus avoiding the scanning of the first sub-pixel 201, or by controlling the timing control module to be disconnected from the first gate electrode driver unit 301, effectively interrupting the connection between them, which also results in the non-scanning of the first sub-pixel 201.

The present application discloses a display panel and its driving method, along with an electronic device. In the display stage of a first type frame, the first sub-pixel can be turned off by controlling the first gate electrode driver unit, meaning that the first sub-pixel is not scanned. This change results in the transition from sequentially scanning both the first sub-pixel and the second sub-pixel simultaneously to at least non-scanning of the first sub-pixel within the same time frame. Relatively speaking, the scanning duration for the second sub-pixel can be extended, effectively utilizing the time originally required to scan the first sub-pixel. This, in turn, increases the charging duration of the second sub-pixel, leading to an improvement in color accuracy and enhancing the quality of the displayed screen image.

The display panel, the driving method thereof, and the electronic device thereof provided by the embodiment of the present application are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments or equivalently replace some of the technical features. These modifications or replacements do not make the essence of the technical solutions depart from a range of the technical solutions of the embodiments of the present application.

What is claimed is:

1. A display panel, comprising:

data lines;

a first sub-pixel and a second sub-pixel disposed adjacent to each other and connected to one of the data lines, wherein a color of the first sub-pixel is different from a color of the second sub-pixel, the data line is configured to sequentially transmit a first data voltage and a second data voltage corresponding to the first sub-pixel, the second sub-pixel, respectively; and a first gate electrode driver unit and a second gate electrode driver unit connected to the first sub-pixel and the second sub-pixel, respectively;

wherein in a display stage of a first type frame, the second gate electrode driver unit outputs a first effective scan signal for switching on the second sub-pixel to emit light based on the second data voltage, and the first gate electrode driver unit controls the first sub-pixel to switch off;

wherein in a display stage of a second type frame, the first gate electrode driver unit outputs a third effective scan signal to control the first sub-pixel to switch on and be loaded with the first data voltage to emit light, the second gate electrode driver unit outputs the first effective scan signal to control the second sub-pixel to switch on and be loaded with the second data voltage to emit light.

2. The display panel according to claim 1, wherein in the display stage of the first type frame, the first data voltage comprises a first sub-data voltage that is equal to the second data voltage, when the second sub-pixel switches on, the data line sequentially transmits the first sub-data voltage and the second data voltage corresponding to the first sub-data voltage.

3. The display panel according to claim 2, further comprising:

a third sub-pixel disposed adjacent to the second sub-pixel, wherein the third sub-pixel and the second sub-pixel are connected to one of the data lines, a color of the third sub-pixel is different from a color of the first sub-pixel and a color of the second sub-pixel, the data line is configured to sequentially transmit the first data voltage, the second data voltage, and a third data voltage corresponding to the first sub-pixel, the second sub-pixel, and the third sub-pixel that are disposed consecutively; and a third gate electrode driver unit connected to the third sub-pixel;

wherein in the display stage of the first type frame, after the second sub-pixel switches on, the third gate electrode driver unit outputs a second effective scan signal to control the third sub-pixel to switch on and load the third data voltage, or the third gate electrode driver unit controls the third sub-pixel to switch off.

4. The display panel according to claim 3, further comprising a plurality of pixel units connected the same one of the data lines, each of the pixel units comprises the first sub-pixel, the second sub-pixel, and the third sub-pixel;

wherein in the display stage of the first type frame, a time period in which the third sub-pixel of previous one of the pixel units switches on has no overlap with a time period of the first sub- data voltage corresponding to the first sub-pixel of next one of the pixel units transmitted by the data lines.

5. The display panel according to claim 4, wherein in the display stage of the first type frame, the first data voltage further comprises a second sub-data voltage, the second sub-data voltage is equal to the third data voltage, and when corresponding to the time period in which the third sub-pixel of previous one of the pixel units switches on and corresponding to a time period in which the first sub-pixel of next one of the pixel units switches off, the data line sequentially transmits the third data voltage, the second sub-data voltage, and the first sub-data voltage.

6. The display panel according to claim 4, wherein in the display stage of the first type frame, a time interval is between an end moment of the time period of the third sub-pixel of previous one of the pixel units and start moment of a time period in which the second sub-pixel of next one of the pixel units switches on.

7. The display panel according to claim 3, further comprising a plurality of pixel units connected the same one of the data lines, wherein each of the pixel units comprises the first sub-pixel, the second sub-pixel, and the third sub-pixel;

wherein in the display stage of the first type frame, the third data voltage comprises a third sub-data voltage and a fourth sub-data voltage, an absolute value of a difference between the third sub-data voltage and the second data voltage corresponding to the same one of the pixel units is greater than a difference between the fourth sub-data voltage and the second data voltage, and when the third sub-pixel switches on, the data line sequentially transmits the third sub-data voltage and the fourth sub-data voltage.

8. The display panel according to claim 3, further comprising a plurality of pixel units connected the same one of the data lines, each of the pixel units comprises the first sub-pixel, the second sub-pixel, and the third sub-pixel;

wherein in the display stage of the first type frame, the third gate electrode driver unit controls the third sub-pixel to switch off, the third data voltage at least comprises a fifth sub-data voltage, the fifth sub-data voltage corresponding to the same one of the pixel units is equal to the second data voltage, when the second sub-pixel switches on and the third sub-pixel switches off, the data line sequentially transmits the second data voltage and the fifth sub-data voltage corresponding to the data line.

9. The display panel according to claim 1, wherein the same one of the data line is connected to a plurality of the first sub-pixels and a plurality of the second sub-pixels, the data line is at least configured to sequentially transmit the first data voltage and the second data voltage;

wherein in the display stage of the first type frame, the second gate electrode driver units output the first effective scan signals respectively to control the second sub-pixels to sequentially switch on and be loaded with a corresponding one of the second data voltage to emit light, and each of the first gate electrode driver units controls a corresponding one of the first sub-pixels to switch off.

10. The display panel according to claim 1, further comprising:

a timing control module connected to the first gate electrode driver unit and the second gate electrode driver unit;

wherein in the display stage of the first type frame, the timing control module transmits a effective clock signal to the second gate electrode driver unit such that the second gate electrode driver unit outputs the first effective scan signal, the timing control module transmits a null clock signal to the first gate electrode driver unit such that the first gate electrode driver unit outputs a null scan signal to the first sub-pixel, or the timing control module is disconnected from the first gate electrode driver unit such that the first gate electrode driver unit is disconnected from the first sub-pixel.

11. A display panel driving method, configured to drive a display panel comprising data lines, a first sub-pixel and a second sub-pixel disposed adjacent to each other and connected to one of the data lines, wherein a color of the first sub-pixel is different from a color of the second sub-pixel, the data line is configured to sequentially transmit a first data voltage and a second data voltage corresponding to the first sub-pixel, the second sub-pixel, respectively, and a first gate electrode driver unit and a second gate electrode driver unit connected to the first sub-pixel and the second sub-pixel, respectively, wherein in a display stage of a first type frame, the second gate electrode driver unit outputs a first effective scan signal for switching on the second sub-pixel to emit light based on the second data voltage, and the first gate electrode driver unit controls the first sub-pixel to switch off;

wherein the display panel driving method comprises:

in the display stage of the first type frame, controlling the second gate electrode driver unit to output the first effective scan signal to control the second sub-pixel to switch on, and controlling the second data voltage to be loaded to the second sub-pixel to drive the second sub-pixel to emit light; and in the display stage of the first type frame, controlling the first gate electrode driver unit to control the first sub-pixel to switch off;

wherein the display panel further comprises a timing control module connected to the first gate electrode driver unit and the second gate electrode driver unit;

wherein in the step of in the display stage of the first type frame, controlling the first gate electrode driver unit to control the first sub-pixel to switch off, comprises:

in the display stage of the first type frame, controlling the timing control module to transmit a null clock signal to the first gate electrode driver unit such that the first gate electrode driver unit outputs a null scan signal to the first sub-pixel, or controlling the timing control module to be disconnected from the first gate electrode driver unit such that the first gate electrode driver unit is disconnected from the first sub-pixel.

12. An electronic device, comprising a display panel, wherein the display panel comprises:

data lines;

a first sub-pixel and a second sub-pixel disposed adjacent to each other and connected to one of the data lines, wherein a color of the first sub-pixel is different from a color of the second sub-pixel, the data line is configured to sequentially transmit a first data voltage and a second data voltage corresponding to the first sub-pixel, the second sub-pixel, respectively; and a first gate electrode driver unit and a second gate electrode driver unit connected to the first sub-pixel and the second sub-pixel, respectively;

wherein in a display stage of a first type frame, the second gate electrode driver unit outputs a first effective scan signal for switching on the second sub-pixel to emit light based on the second data voltage, and the first gate electrode driver unit controls the first sub-pixel to switch off;

wherein in the display stage of the first type frame, the first data voltage at least comprises first sub-data voltage, the first sub-data voltage is equal to the second data voltage, when the second sub-pixel switches on, the data line sequentially transmits the first sub-data voltage and the second data voltage corresponding to the first sub-data voltage.

13. The electronic device according to claim 12, further comprising:

a third sub-pixel disposed adjacent to the second sub-pixel, wherein the third sub-pixel and the second sub-pixel are connected to the same one of the data lines, a color of the third sub-pixel is different from a color of the first sub-pixel and a color of the second sub-pixel, the data line is configured to sequentially transmit the first data voltage, the second data voltage, and a third data voltage corresponding to the first sub-pixel, the second sub-pixel, and the third sub-pixel that are disposed consecutively; and a third gate electrode driver unit connected to the third sub-pixel;

wherein in the display stage of the first type frame, after the second sub-pixel switches on, the third gate electrode driver unit outputs a second effective scan signal to control the third sub-pixel to switch on and load the third data voltage, or the third gate electrode driver unit controls the third sub-pixel to switch off.

14. The electronic device according to claim 13, further comprising a plurality of pixel units connected the same one of the data lines, each of the pixel units comprises the first sub-pixel, the second sub-pixel, and the third sub-pixel;

wherein in the display stage of the first type frame, a time period in which the third sub-pixel of previous one of the pixel units switches on has no overlap with a time period of the first sub-data voltage corresponding to the first sub-pixel of next one of the pixel units transmitted by the data lines.

15. The electronic device according to claim 14, wherein in the display stage of the first type frame, the first data voltage further comprises a second sub-data voltage, the second sub-data voltage is equal to the third data voltage, and when corresponding to the time period in which the third sub-pixel of previous one of the pixel units switches on and corresponding to a time period in which the first sub-pixel of next one of the pixel units switches off, the data line sequentially transmits the third data voltage, the second sub-data voltage, and the first sub-data voltage.

16. The electronic device according to claim 14, wherein in the display stage of the first type frame, a time interval is between an end moment of the time period of the third sub-pixel of previous one of the pixel units and start moment of a time period in which the second sub-pixel of next one of the pixel units switches on.

17. The electronic device according to claim 14, further comprising a plurality of pixel units connected the same one of the data lines, wherein each of the pixel units comprises the first sub-pixel, the second sub-pixel, and the third sub-pixel;

wherein in the display stage of the first type frame, the third data voltage comprises a third sub-data voltage and a fourth sub-data voltage, an absolute value of a difference between the third sub-data voltage and the second data voltage corresponding to the same one of the pixel units is greater than a difference between the fourth sub-data voltage and the second data voltage, and when the third sub-pixel switches on, the data line sequentially transmits the third sub-data voltage and the fourth sub-data voltage.

* * * * *